US007660794B2

(12) United States Patent
Scoredos (10) Patent No.: US 7,660,794 B2
(45) Date of Patent: Feb. 9, 2010

(54) METHOD AND PROGRAM PRODUCT FOR REDUCING DATABASE WALK FREQUENCY WHILE REPETITIVELY ACCESSING A FIREWALL CONNECTION AND RULE DATABASE

(75) Inventor: Eric C. Scoredos, Boulder Creek, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 712 days.

(21) Appl. No.: 10/453,102

(22) Filed: Jun. 3, 2003

(65) Prior Publication Data

US 2004/0249812 A1 Dec. 9, 2004

(51) Int. Cl.
*G06F 17/30* (2006.01)
(52) U.S. Cl. .......................... 707/9; 709/230; 711/216; 726/11
(58) Field of Classification Search .................. 707/9; 709/230; 711/216; 726/11
See application file for complete search history.

(56) References Cited

U.S. PATENT DOCUMENTS

| 5,107,489 | A | 4/1992 | Brown et al. | |
|---|---|---|---|---|
| 5,592,622 | A | 1/1997 | Isfeld et al. | |
| 6,026,082 | A | 2/2000 | Astrin | |
| 6,101,189 | A | 8/2000 | Tsuruoka | |
| 6,282,605 | B1* | 8/2001 | Moore | 711/103 |
| 6,480,839 | B1* | 11/2002 | Whittington et al. | 707/3 |
| 6,493,721 | B1* | 12/2002 | Getchius et al. | 707/104.1 |
| 6,546,425 | B1 | 4/2003 | Hanson et al. | |
| 6,633,539 | B1 | 10/2003 | Basso et al. | |

(Continued)

FOREIGN PATENT DOCUMENTS

JP  2001-313640  11/2001

(Continued)

OTHER PUBLICATIONS

Yoshida, Takayuki; Notification of Reason for Rejection in JP 2004-165237 with English Translation; Japanese Patent Office, Aug. 1, 2006.

(Continued)

*Primary Examiner*—Apu M Mofiz
*Assistant Examiner*—Monica M Pyo (57) ABSTRACT

A database operable in a multithreaded environment has a database update code. Each thread accessing the database obtains lock prior to walking the database. Any thread that alters database structure, such as by adding or deleting a record of the database, writes the database update code. Before releasing lock, the thread copies the database update code and a current record pointer into memory locations private to the thread. When a thread requires a second access to a record of the database, it obtains lock. The thread then compares its copy of the update code to the database update code, if they are different the thread must re-walk the database to locate the record since database structure has changed since the thread first accessed the database. If the thread's copy of the update code matches the database update code, database structure has not changed since a prior access of the thread to the database; in this case the record may be accessed through the thread's copy of the record pointer with no walk required. In a particular embodiment, the database is accessed through a hash table and contains firewall connection and filter rule information.

9 Claims, 5 Drawing Sheets

U.S. PATENT DOCUMENTS

| | | | |
|---|---|---|---|
| 6,816,455 B2 * | 11/2004 | Goldberg et al. | 370/230 |
| 7,106,736 B2 | 9/2006 | Kalkunte | |
| 2002/0176426 A1 | 11/2002 | Asano et al. | |

FOREIGN PATENT DOCUMENTS

| | | |
|---|---|---|
| JP | 2002-344530 | 11/2002 |

OTHER PUBLICATIONS

Nobahar, Abdulhakim; Office Action in U.S. Appl. No. 10/453,043, Jan. 25, 2007, 5 pages.

Nobahar, Abdulhakim; Office Action in U.S. Appl. No. 10/453,043, May 17, 2007, 15 pages.

Nobahar, Abdulhakim; Office Action in U.S. Appl. No. 10/453,043, Nov. 8, 2007, 17 pages.

* cited by examiner

METHOD AND PROGRAM PRODUCT FOR REDUCING DATABASE WALK FREQUENCY WHILE REPETITIVELY ACCESSING A FIREWALL CONNECTION AND RULE DATABASE

RELATED APPLICATIONS

The present application is related to the material of copending, co-filed, U.S. patent application Ser. No. 10/453,043, the disclosure of which is hereby incorporated herein by reference.

FIELD

The present application relates to the field of database locking and walking in multithreaded systems.

BACKGROUND

A database having thousands of entries often has complex structure. Hash table and tree structures (including B-trees) are common in the database art.

Navigating a database to find a particular database record is known to be a potentially time consuming process, typically requiring following multiple pointers and, in the case of a hash table structure, computing hash functions. Hash table structures also require searching for an exact match or empty location after indexing into a hash table. Hash table datastructures constructed with dynamically allocated memory may require following a considerable number of pointers to locate a record in the database. Following database structure to locate a particular record of a database is known herein as "walking" the database.

Adding a record to a database typically requires finding a parent or previous record in the database, allocating a new memory data record, then manipulating pointers to add the new record to the database. Similarly, deleting a record from a database requires knowledge of the location of the parent or previous record in the database, as well as the current record.

Many modern operating systems, including recent versions of Microsoft Windows, are multithreaded operating systems. These systems permit programs to be divided into multiple threads, each thread containing executable code and data that can be invoked independently of other threads by multitasking management code of the operating system. Typically, the operating system assigns a processor to execute a thread for a period of time, then interrupts execution of the thread and allows another thread to execute. Typically, code of a thread can share data with other threads of the program. These systems also permit part or all of the executable code to be common code, executed independently on separate data.

Multithreaded operating systems may also execute on multiple processors of a system. Threads may be assigned by the operating system to different processors for execution, therefore several threads may be executed simultaneously by the system, with each processor timeshared among yet more threads.

A firewall system requires a database of rules for filtering network communication packets as they are relayed through multiple network interfaces of the system. Packets are often associated with connections; it is known that threads may be associated with packets associated with particular connections through the firewall. A firewall structured in this way may have hundreds or thousands of threads each of which may receive execution resources at any time.

In a multithreaded environment, it is typically necessary to ensure that database structures are not changed by a first thread while a second thread modifies database structure, as happens when the second thread adds new records to, or deletes existing records from, the database. Simultaneous access by the first and second threads to database structure may cause database link corruption, leading to threads following an invalid link, resulting in access to random locations or uninitialized memory contents; a memory out-of-bounds error may also occur. A database-lock mechanism is typically used to prevent the first thread from accessing database structure while the second thread alters database structure. Once the second thread is done altering database structure, the first thread is permitted to access the database.

Database lock mechanisms may be exclusive, where exclusive access is obtained by a thread for reading or writing to database structure. Database lock mechanisms are also known that are nonexclusive for read, but exclusive for write, where lock for read prevents grant of lock for write.

A firewall connection and filter rule information database can require multiple accesses by a thread to the same record of the database; these accesses can be separated in time. A connection and filter rule information database can serve as a limit table as described in copending, cofiled, U.S. patent application Ser. No. 10/453,043. For example, it can be desirable to keep a count of connections through the firewall between particular upper level protocol (ULP) ports at particular Internet Protocol (IP) addresses in a connection database record. The ULP may be Transmission Control Protocol (TCP), User Datagram Protocol UDP, or a similar protocol. The ULP may involve layered protocols, such as Simple Mail Transfer Protocol (SMTP) which typically operates over port 25 of TCP. A connection database record used for counting current SMTP-over-TCP connections between particular IP addresses is accessed at least on initiation and completion of each SMTP-over-TCP connection.

Since walking a database can take considerable time, it is desirable to minimize the number of times per connection at which the database must be walked.

SUMMARY

A database operable in a multithreaded environment and accessed through a hash table has a database update code. A lock mechanism is provided such that a thread may obtain access to the database while ensuring that no other thread is concurrently writing database structure.

Each thread accessing the database obtains lock prior to walking the database. Any thread that alters database structure, such as by adding or deleting a record of the database, writes the database update code. Before releasing lock, the thread copies the update code and current record pointer into memory locations private to the thread.

When a thread requires a second access to a record of the database, it obtains lock. The thread then compares its copy of the update code to the database update code, if they are different the thread must re-walk the database to locate the record since database structure has changed since the thread first accessed the database. If the thread's copy of the update code matches the database update code, database structure has not changed since a prior access of the thread to the database; in this case the record may be accessed through the thread's copy of the record pointer with no walk required.

In a particular embodiment, the database is accessed through a hash table and contains firewall connection and filter rule information.

DETAILED DESCRIPTION OF THE EMBODIMENTS

A firewall system contains a database of connection and filter rule information. This database 100, illustrated in FIG. 1, has a database header 102 containing a lock flag 104, storage for an update code 106, a pointer 108 to a hash bucket table 110, a hash table mask 112.

Figure 2:
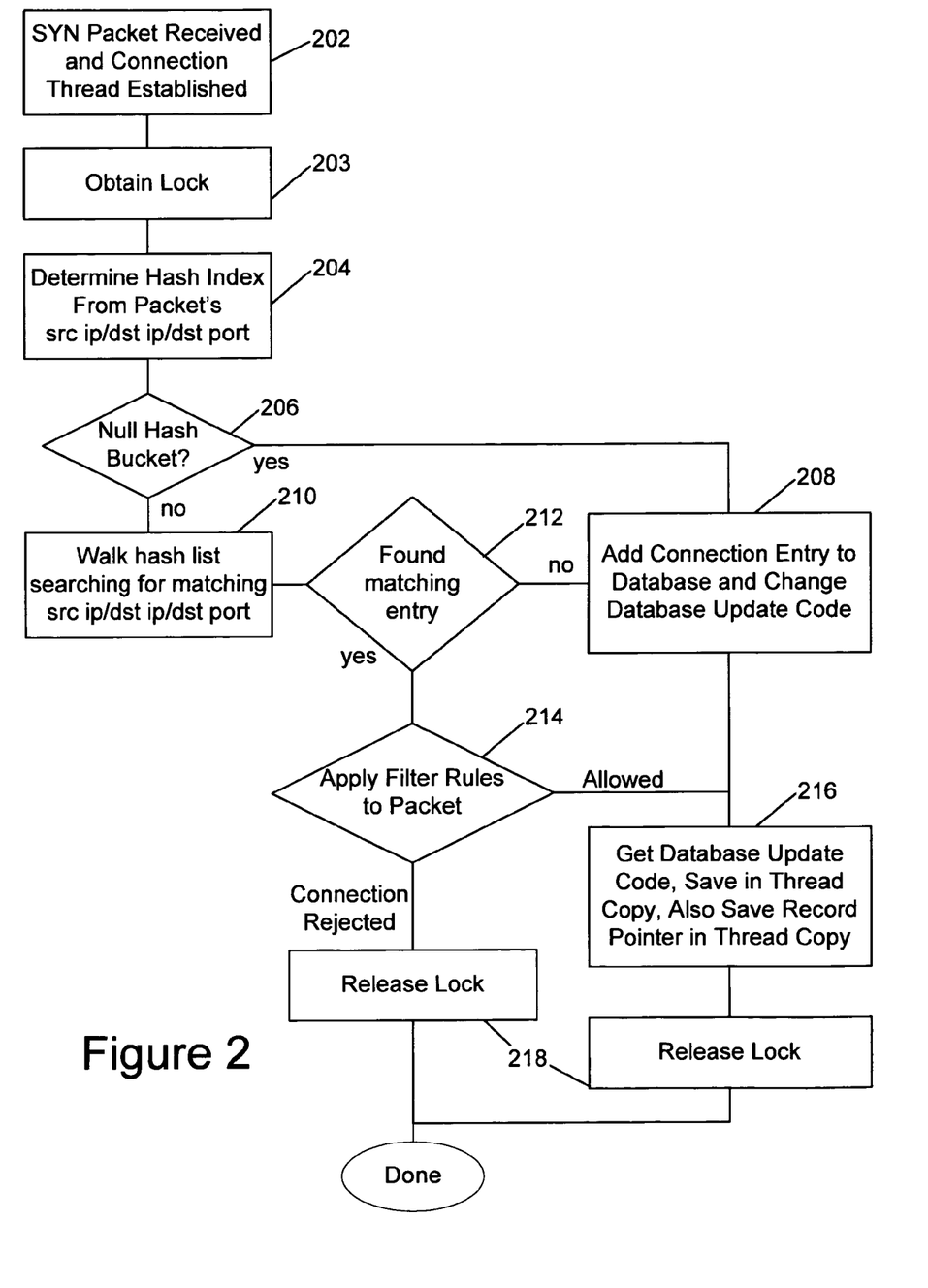
FIG. 2 is an exemplary flowchart of actions taken by the firewall system to access the connection and rule database when a connection thread is initialized.

The firewall system constructs a thread for each connection through the firewall as illustrated in the flowchart of FIG. 2. A connection thread is created 202 when a SYN packet, requesting setup of a TCP connection, is received by the firewall. The SYN packet information is stored in memory local to the thread, and is used to determine whether the SYN packet should be forwarded or blocked.

Figure 1:
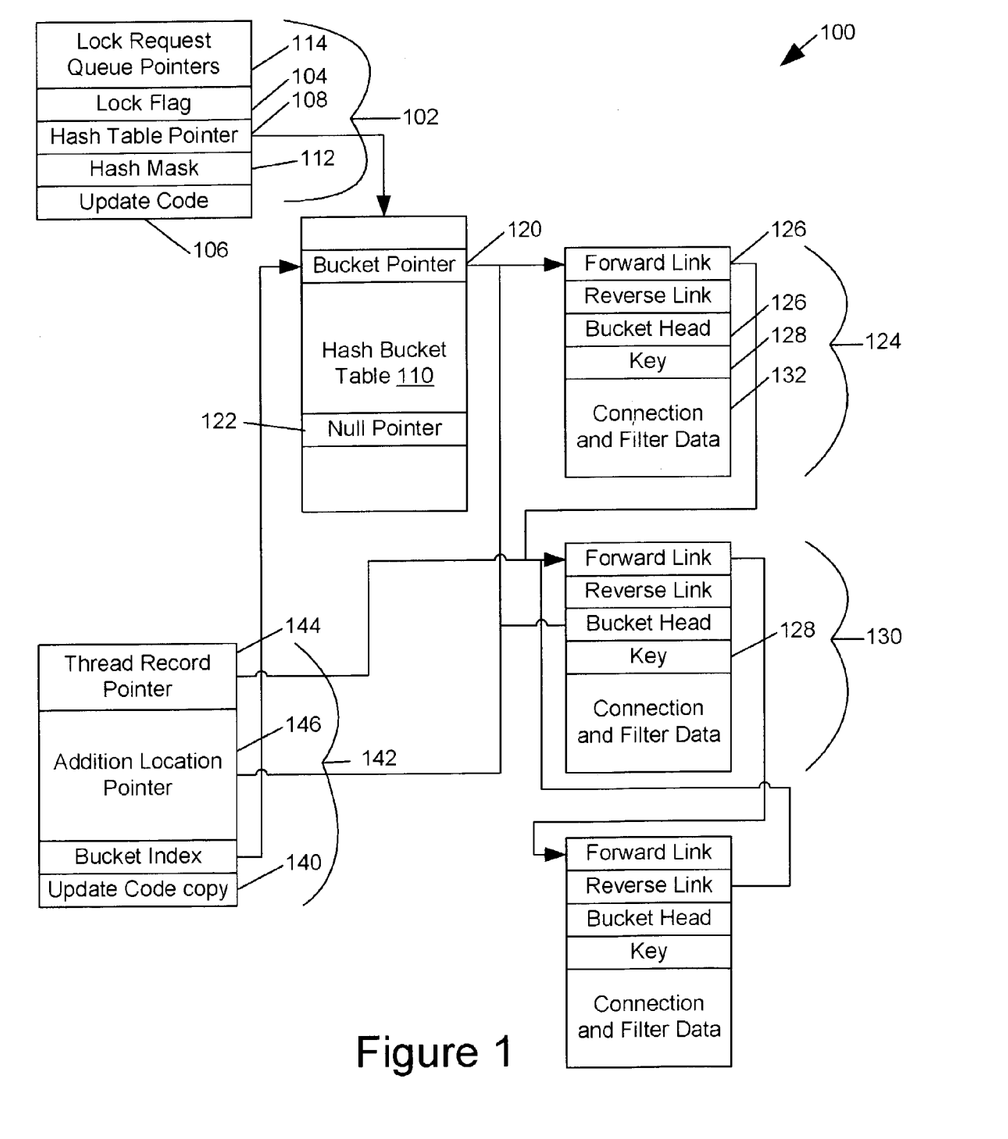
FIG. 1 is an exemplary block diagram of a database, such as a firewall connection and rule database, accessed through a hash-table.

When a thread, including a newly created connection thread 202, requires access to the database 100, it tests the lock flag 104 to ensure that no other thread is accessing database structure. If the lock flag 104 is already set, the thread in one embodiment waits and rechecks the lock flag 104 later, rechecking the lock flag 104 is known as a spinlock. In another embodiment the thread is linked to a lock request queue 114 associated with the database. Whenever an existing lock is released one thread pending on lock request queue 114 is reactivated and granted lock. If the lock flag 104 was clear, the lock flag 104 is set and execution of the thread continues. The lock obtained 203 is therefore exclusive for reading or writing database structure. In an alternative embodiment, a nonexclusive read-lock is implemented with an exclusive write-lock.

The thread then determines 204 a hash index based upon a search key. In the firewall system, when locating connection records the search key includes a source IP address, a destination IP address, and a destination port number, associated with the connection. When locating rules, the search key may include part or all of the source IP address, destination IP address, and destination port number. The hash index is used to locate an associated bucket pointer 120 in hash bucket table 110.

If 206 the bucket pointer 120 is null, such as null pointer 122, an associated connection record similar to record 124 is created, initialized, and added 208 to the database; addition of records 124 to the database constitutes altering database structure.

If the bucket pointer 120 is not null, the pointer points to a linked list of connection records 124, where each record contains a forward link 126 and key information 128. In the firewall, the key information 128 includes source and destination IP addresses and a destination port number. The thread walks 210 the list, following forward links 126 until a record, such as record 130, is found where the key information 128 of the record matches a search key. If 212 no matching key is found in the database, as indicated by a key mismatch and a null forward link 126, a new record is created, initialized, and added 208 to the database.

If 212 a matching key is found in the database, any filter rules found in a connection and filter data 132 portion of the record are applied 214 to the attempted new connection. An attempted new connection may be allowed or rejected according to the filter rules. In a particular embodiment of a firewall, connection and filter data 132 includes a connection count field that may hold a count of connections through the firewall from a specific source IP address to a specific destination IP address and destination ULP number. In this embodiment, connection and filter data 132 may also include rule incorporating a maximum connection count for connections from the specific source IP address to the specific destination IP address and destination ULP number.

Whenever a new record is added 208 to the database, or other changes to database structure are made, the database update code 106 is changed. In the copending, cofiled, application the database update code 106 is known as a unique identifier (UID).

Whether a new record was added to the database, or an existing record found, the database update code 106 is copied 216 to an update code copy 140 in a memory area, which may be thread-specific memory area 142. A pointer to the record is also copied into a record pointer 144 in memory, which may be thread-specific memory 142.

Lock is then released 218, allowing other threads to access, and possibly modify, the database.

When a thread must access the same record of the database again, such as when the firewall system receives a further packet associated with a connection, a connection disconnect command packet is received, or when a connection times out and is dropped, the thread has two options. It may re-walk the database structure to locate the record in a manner similar to that heretofore discussed with reference to FIGS. 1 and 2. Alternatively, if the memory areas, such as thread-specific memory 142, are readily accessible, the thread follows an abbreviated access procedure illustrated in the exemplary flowchart of FIG. 3.

Figure 3:
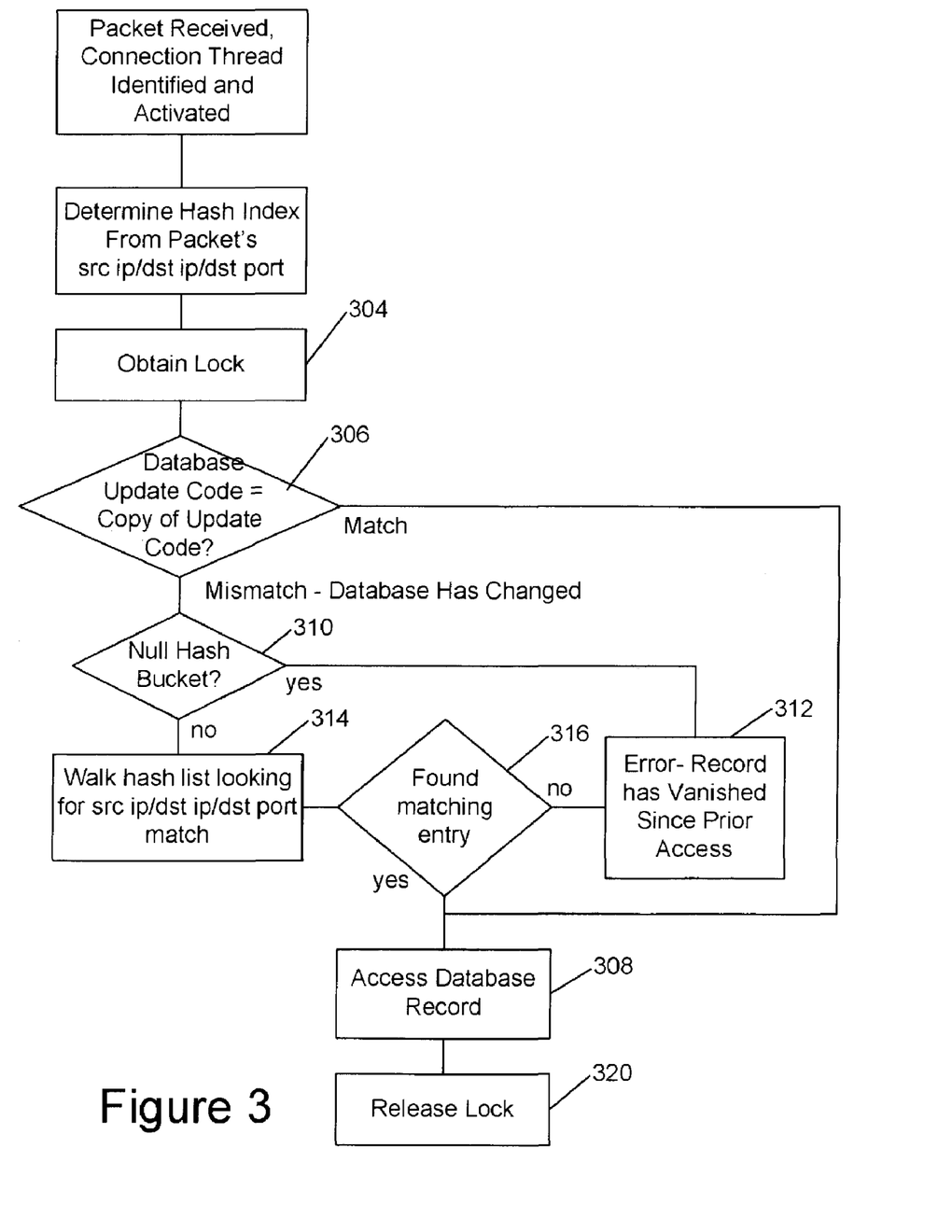
FIG. 3 is an exemplary flowchart of actions taken by the firewall system when a connection thread must access the connection and rule database for a second time.

When following the abbreviated access procedure of FIG. 3, the thread obtains database lock 304. Lock is obtained as heretofore described with reference to lock flag 104 and lock queue 114.

The database update code 106 is compared 306 to the thread's copy of the update code 140 to determine if the database structure has changed since the associated database record was last found and referenced by the thread. If 306 the database update code 106 matches the thread's copy of the update code 140, the thread is permitted to access 308 the database record using the saved thread record pointer 144. If accessing 308 the record involves deleting the record, as may occur when a connection is dropped, or other changes to database structure, the database update code 106 is changed. If accessing 308 the record involves changes to data stored within the record, such as a connection count, without change to database structure the database update code 106 is not changed.

If 306 the database update code 106 does not match the thread's copy of the update code 140, the database structure has likely changed since any prior access to the database record thread. In this event, the hash index is used to locate an associated bucket pointer 120 in hash bucket table 110.

If 310 the bucket pointer 120 is null, such as null pointer 122, no connection record exists in the database, which may be an error condition 312.

If the bucket pointer 120 is not null, the pointer points to a linked list of connection records 124, where each record contains a forward link 126 and key information 128. The thread walks 314 the list, following forward links 126 until a record, such as record 130, is found where the key information 128 of the record matches the search key. If 316 no matching key is found in the database, as indicated by a key mismatch and a null forward link 126, an error 312 may have occurred. Since error 312 should never occur, an alternative embodiment does not check for these error conditions.

If 316 a record, such as record 130, having a matching key is found in the database, a pointer to the record 130 is saved in the thread record pointer 144 and the thread is permitted to access 308 the record.

Accessing 308 the record may involve addition of a record to the database, or otherwise altering database structure. If database structure is altered, the database update code 106 is updated.

When access 308 to the record completes, the database lock is released 320.

In an embodiment, update code 106 is a counter incremented each time the update code is changed. In an alternative embodiment, update code 106 is written with a value determined from the search key used to locate the record being added to, or deleted from, the database at the time database structure is changed.

In an embodiment used as a network firewall, the database contains connection state information associated with the TCP and UDP protocols for each TCP and UDP connection. In an alternative embodiment, connection state information associated with the TCP and UDP protocols for each TCP and UDP connection is stored in a separate state table database. In this alternative embodiment the separate state table database is also accessed through a hash function comprising a hash function of the internet protocol source address, internet protocol destination address, and upper level protocol port number associated with each packet.

Figure 3A:
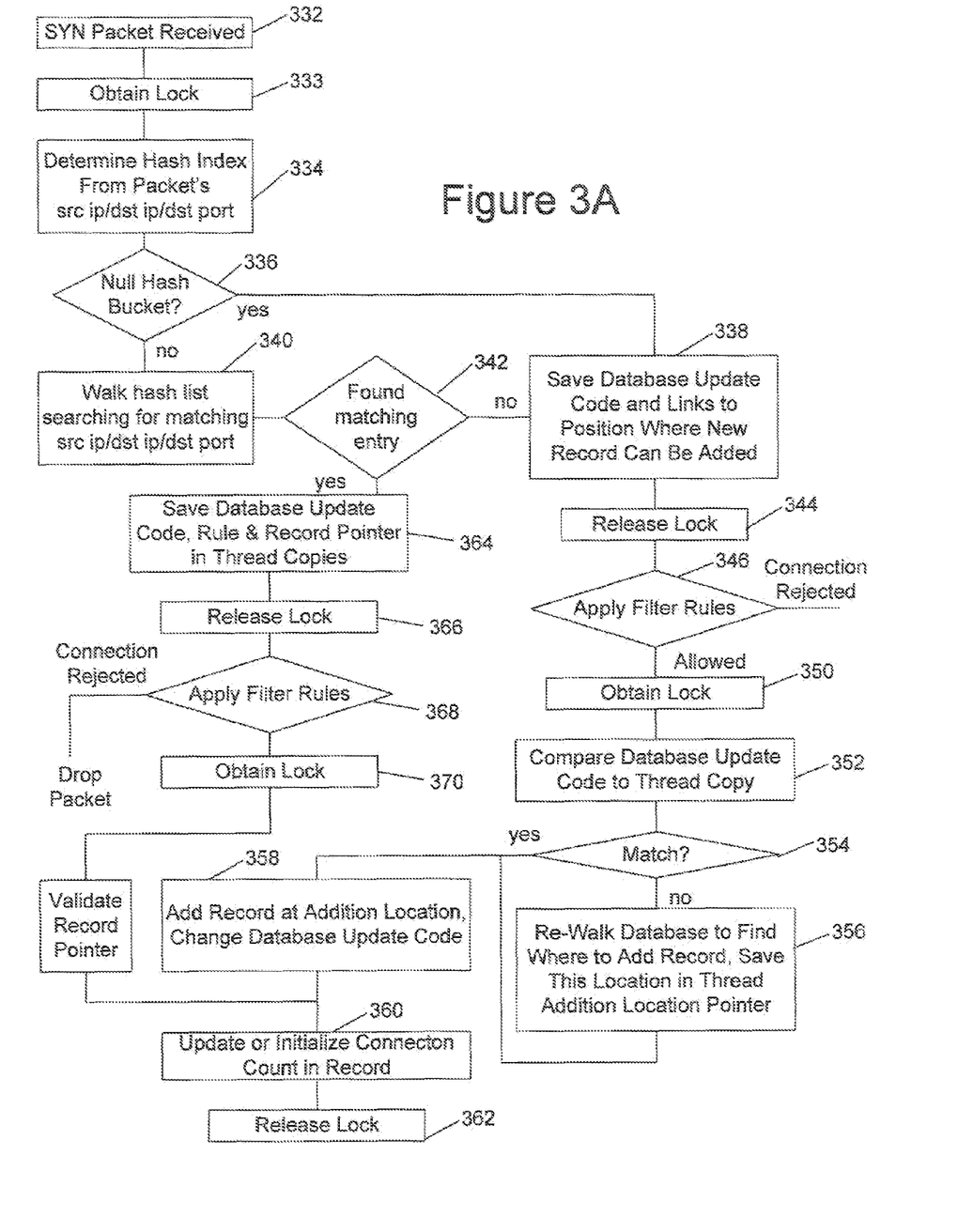
FIG. 3A is an exemplary flowchart of actions taken by an alternative embodiment of the firewall system to access the connection and rule database when a connection thread is initialized.

An alternative embodiment of the firewall system constructs a thread for each connection through the firewall as illustrated in the flowchart of FIG. 3A. In this embodiment, a connection thread is created 332 when a SYN packet, requesting setup of a TCP connection, is received by the firewall. The SYN packet information is stored in memory local to the thread, and is used to determine whether the SYN packet should be forwarded or blocked by the firewall.

When a thread, including a newly created connection thread, requires access to the database 100, it obtains lock 333 as previously discussed with reference to the lock flag 104 to ensure that no other thread is accessing database structure.

The thread then determines 334 a hash index based upon a search key. In the firewall system, the search key includes a source IP address, a destination IP address, and a destination port number, associated with the desired connection. The hash index is used to locate an associated bucket pointer 120 in hash bucket table 110.

If 336 the bucket pointer 120 is null, such as null pointer 122, the database update code 106 is saved, at step 338, in an update code copy 140 local to the thread, and information required to add a record to the database, such as a pointer to the null hash bucket entry, is also saved in a addition location pointer 146 local to the thread. The information required to add a record to the database includes information regarding where a new record should be linked into existing database structure If the bucket pointer 120 is not null, the pointer points to a linked list of connection records 124, where each record contains a forward link 126 and key information 128. In the firewall, key information 128 includes source and destination IP addresses and a destination port number. The thread walks 340 the list, following forward links 126 until a record, such as record 130, is found where the key information 128 of the record matches a search key. If 342 no matching key is found in the database, as indicated by a key mismatch and a null forward link 126, the database update code 106 is saved, at step 338, in an update code copy 140 local to the thread, and information required to add a record to the database, such as a pointer to the last record of the list, is also saved in an addition location pointer 146 local to the thread.

In both cases where a record is not found, database lock is then released 344. Firewall rules, which may include rules external to database 100 such as rules that block all connections to ranges of port numbers irrespective of IP addresses and rules that block all incoming connections to ranges of destination IP addresses, are then applied 346. If connection is allowed, the thread obtains database lock again 350. If connection is rejected, the packet may be dropped or the associated connection may be reset.

The current database update code 106 is compared 352 to the thread's copy of the update code 140 to determine if the database structure has changed since the database was walked in those steps of steps 334, 336, 348, 340, 342 previously executed by the thread. If 354 the database update code 106 does not match the thread's copy of the update code 140, the thread re-walks 356 the database 100 to determine where a new connection record, such as connection record 130, should be added to the database; the addition location may be saved in the addition location pointer 146. A new database record is then added 358 to the database at the location determined by rewalking 356 the database, or, if the database update code 106 matched the thread's copy of the update code 140, the location indicated by the addition location pointer 146. Since a record has been added to the database, the database update code 106 is changed.

The database record is initialized or updated as required 360, and lock is released 362.

If 342 an existing entry was found in the database 100, the database update code 106 and current record pointer are saved 364 in local copies 140, 144. Lock is then released 366, since the thread will be performing, for a time, functions that do not involve the database.

Filter rules, if any, found in a connection and filter data 132 portion of the record found are applied 368 to the attempted new connection. Additional rules external to database 100 may also be applied 368. An attempted new connection may be allowed or rejected according to the filter rules. The filter rules include rules found in database 100 that limit the number of connections from specific source IP addresses to specific destination IP addresses and port numbers.

If the new connection is allowed, lock is obtained 370 once more. The record pointer 144 previously saved in thread-specific memory is validated by comparing the database update code 106 to the thread copy of the update code 140 and, if a mismatch is found, by re-walking the database to obtain a valid pointer. A connection count in the record is then updated 360 to indicate that an additional connection is established. Lock is then released 362, and execution continues.

Figure 4:
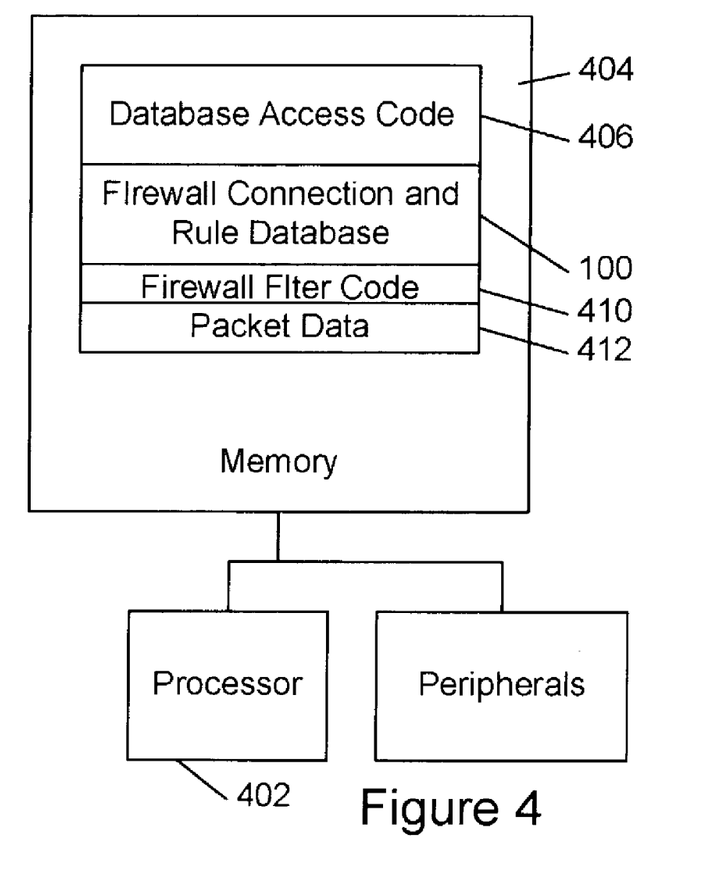
FIG. 4 is an exemplary block diagram of an apparatus for accessing a database.

An apparatus for accessing a database is illustrated in FIG. 4. This apparatus includes a processor 402 and a memory system 404, the memory system 404 may include multiple levels of memory including one or more levels of cache memory, RAM, and may but need not include levels of disk memory and EPROM memory. Memory system also includes database 100 and computer code 406 for accessing the database. The apparatus of FIG. 4 may be part of a firewall system, in which case the memory system includes firewall packet relay and filtering code 410 and storage space for packet data 412.

A computer program product is any machine-readable media, such as an EPROM, ROM, RAM, DRAM, disk memory, or tape, having recorded on it computer readable code that, when read by and executed on a computer, instructs that computer to perform a particular function or sequence of functions. The computer readable code of a program product may be part or all of a program, such as a program for accessing a database. A computer system, such as illustrated in FIG. 4, having memory, the memory containing computer code 406 for instructing a processor to execute the heretofore described method is a computer program product.

While the forgoing has been particularly shown and described with reference to particular embodiments thereof, it will be understood by those skilled in the art that various other changes in the form and details may be made without departing from the spirit and hereof. It is to be understood that various changes may be made in adapting the description to different embodiments without departing from the broader concepts disclosed herein and comprehended by the claims that follow.

What is claimed is:

1. A method of tracking connections through a multi-threaded firewall using a connection database and an update code associated with the connection database, the method comprising:

receiving a packet containing a source internet protocol address, and a destination internet protocol address;
obtaining a lock on the connection database;
computing a hash index into the connection database from at least the destination internet protocol address;
saving an existing value of the update code
walking the database to locate any extant record in the connection database applicable to connections to the destination internet protocol address, saving a pointer to the extant record if one is found, and, if no extant record is found, saving a pointer representing a location for a new record to be added;
releasing the lock on the connection database;
applying filter rules to the packet; and
wherein, when the filter rules allow the packet to pass through the firewall, and the packet establishes a new connection to the destination internet protocol address, and wherein there was no extant record applicable to connections to the destination address, the method further comprises:
obtaining another lock on the connection database;
when the saved existing value of the update code matches a current value of the update code, adding the new record to the database by using the saved pointer representing the location for the new record to be added;
when the saved existing value of the update code fails to match the current value of the update code, walking the database to locate the location for the new record to be added, and adding the new record to the database;
changing the update code; and
releasing the another lock on the connection database;
wherein mismatch of the current value of the update code and the saved existing value of the update code is indicative of an intervening change to database structure.

2. The method of claim 1 wherein the hash index is further computed from the source internet protocol address and a port number of the packet.

3. The method of claim 1 wherein the filter rules comprise connection count limitations for specific internet protocol addresses.

4. A firewall system comprising a processor executing a multithreaded operating system and coupled to receive packet filtering code from a memory, and peripherals for receiving and forwarding internet protocol (IP) packets;

wherein the memory has recorded therein a connection database and an update code associated with the connection database; and
wherein the packet filtering code comprises machine readable instructions comprising instructions for:
receiving a packet containing a source IP address and a destination IP address;
obtaining a lock on the connection database;
computing a hash index into the connection database from at least the destination IP address of a received packet;
saving an existing value of the update code;
walking the database to locate any extant record in the connection database applicable to connections between the source IP address and the destination IP address, saving a pointer to the extant record if one is found, and, if no extant record is found, saving pointer representing a location for a new record to be added;
releasing the lock on the connection database;
applying filter rules to the packet; and
wherein, when the filter rules allow the packet to pass through the firewall, the packet establishes a new connection, and wherein there was no extant record in the connection database applicable to connections between the source IP address and the destination IP address, the method further comprises:
obtaining another lock on the connection database;
when the saved existing value of the update code matches a current value of the database update code, and wherein mismatch of the current value of the update code and the saved existing value of the update code indicates of an intervening change to database structure, adding the new record to the database using the pointer representing the location for the new record to be added;
when the saved existing value of the update code fails to match the current value of the update code, walking the database to locate the location for the new record to be added, and adding the new record to the database;
changing the update code; and
releasing lock on the connection database.

5. The firewall system of claim 4 wherein the hash index is further computed from a port number of the packet.

6. The firewall system of claim 5 wherein the filter rules comprise connection count limitations.

7. The firewall system of claim 6 wherein the filter rules comprise connection count limitations specific to port numbers.

8. The firewall system of claim 4 wherein when an extant record is found in the database and a packet establishing a new connection is allowed, the machine readable instructions further comprise instructions for incrementing a connection count in the record.

9. A computer program product comprising a machine readable media having recorded on it computer readable instructions for:

receiving a packet containing at least a source internet protocol address, and a destination internet protocol address;

computing a hash index into a connection database from at least the destination internet protocol address;

obtaining a lock on the connection database;

saving a database update code;

saving an existing value of an update code associated with the connection database;

walking the database to locate any extant record in the connection database applicable to connections to the destination internet protocol address, saving a pointer to the extant record if one is found, and, if no extant record is found, saving a pointer representing a location for a new record to be added;

releasing the lock on the connection database;

applying filter rules to the packet; and wherein, when the filter rules allow the packet to pass through the firewall, and the packet establishes a new connection to the destination internet protocol address, and wherein there was no extant record applicable to connections to the destination address, the method further comprises:

obtaining another lock on the connection database;

when the saved existing value of the update code matches a current value of the update code, and wherein mismatch of the current value of the update code and the saved existing value of the update code is indicative of an intervening change to database structure, adding a new record to the database by using the saved pointer representing the location for the new record to be added;

when the saved existing value of the update code fails to match the current value of the update code, walking the database to locate the location for the new record to be added, and adding the new record to the database;

changing the update code; and releasing the anotherlock on the connection database.

* * * * *

UNITED STATES PATENT AND TRADEMARK OFFICE
CERTIFICATE OF CORRECTION

| | | |
|---|---|---|
| PATENT NO. | : 7,660,794 B2 | Page 1 of 1 |
| APPLICATION NO. | : 10/453102 | |
| DATED | : February 9, 2010 | |
| INVENTOR(S) | : Eric C. Scoredos | |

It is certified that error appears in the above-identified patent and that said Letters Patent is hereby corrected as shown below:

In column 8, line 38, in Claim 4, after "the" delete "database".

In column 10, line 17, in Claim 9, delete "anotherlock" and insert -- another lock --, therefor.

Signed and Sealed this

Twenty-seventh Day of July, 2010

David J. Kappos
*Director of the United States Patent and Trademark Office*